(12) United States Patent
Chikura et al.

(10) Patent No.: US 7,910,000 B2
(45) Date of Patent: *Mar. 22, 2011

(54) SEAL RING HOLDER FOR MEMBRANE ELEMENT AND MEMBRANE ELEMENT

(75) Inventors: Shinichi Chikura, Ibaraki (JP); Yasuhiro Uda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/417,794

(22) Filed: Apr. 3, 2009

(65) Prior Publication Data

US 2009/0188855 A1    Jul. 30, 2009

Related U.S. Application Data

(63) Continuation of application No. 11/529,524, filed on Sep. 29, 2006, which is a continuation of application No. 10/942,143, filed on Sep. 16, 2004, now Pat. No. 7,172,697.

(30) Foreign Application Priority Data

Sep. 17, 2003   (JP) .............................. P. 2003-324278

(51) Int. Cl.
*B01D 63/10*   (2006.01)
*B01D 65/00*   (2006.01)
*B01D 69/00*   (2006.01)
*F16J 15/02*   (2006.01)

(52) U.S. Cl. .............. 210/321.83; 210/232; 210/321.74; 210/497.1; 277/549

(58) Field of Classification Search .................. 210/232, 210/321.6, 321.72, 321.74, 321.76, 321.83, 210/321.85; 277/530, 549, 560, 562, 567
See application file for complete search history.

(56) References Cited

U.S. PATENT DOCUMENTS 4,698,154 A   10/1987  Mohn et al.
(Continued)

FOREIGN PATENT DOCUMENTS

| JP | 62-170104 U | 10/1987 |
| JP | 11-267468 A | 10/1999 |
| JP | 11-267469 A | 10/1999 |

(Continued)

OTHER PUBLICATIONS

Korean Office Action dated Sep. 27, 2007.

*Primary Examiner* — John Kim
(74) *Attorney, Agent, or Firm* — Sughrue Mion, PLLC (57) ABSTRACT

A seal ring holder for membrane elements which is capable of attaining an increase in the area of membranes packed per element; and a membrane element using the seal ring holder, are provided. The seal ring holder for membrane elements which is disposed at an end part of a spiral wound membrane element to hold a ring seal ring on the outer periphery thereof while allowing a raw liquid to flow into a membrane end part of the membrane element, includes: a first ring part which has a side wall facing an upstream-side membrane end part of the membrane element and is inserted into an end part of a sheathing member of the membrane element; a projecting ring part which has been formed upstream from the first ring part and has side walls respectively on both sides, an edge face of the sheathing member and the downstream-side edge face of the seal ring being fixable respectively to the side walls; a second ring part which is formed upstream from the projecting ring part and to the outer periphery of which the seal ring is to be fitted; and a third ring part which is formed upstream from the second ring part and to which the upstream-side end face of the seal ring is fixable.

7 Claims, 6 Drawing Sheets

U.S. PATENT DOCUMENTS

| | | |
|---|---|---|
| 5,108,604 A | 4/1992 | Robbins |
| 6,224,767 B1 | 5/2001 | Fujwara et al. |
| 6,632,356 B2 | 10/2003 | Hallan et al. |
| 2006/0049093 A1 | 3/2006 | Chikura et al. |

FOREIGN PATENT DOCUMENTS

| | | |
|---|---|---|
| JP | 11-267470 A | 10/1999 |
| JP | 200093761 | 4/2000 |
| JP | 2000354742 | 12/2000 |
| KR | 20030042730 | 6/2003 |

SEAL RING HOLDER FOR MEMBRANE ELEMENT AND MEMBRANE ELEMENT

This is a continuation of application Ser. No. 11/529,524 filed Sep. 29, 2006, which is a continuation of Ser. No. 10/942,143 filed on Sep. 16, 2004, now U.S. Pat. No. 7,172,697. The entire disclosures of the prior applications, application Ser. Nos. 11/529,524 and 10/942,143 are considered part of the disclosure of the accompanying continuation application and is hereby incorporated by reference.

FIELD OF THE INVENTION

The present invention relates to a seal ring holder which holds a seal ring for closing the space between a spiral wound membrane element and a vessel, and a membrane element using the seal ring holder. More particularly, the present invention relates to a seal ring holder with which a membrane element can have a larger amount of a membrane part (membrane leaves) packed therein than before, and a membrane element.

DESCRIPTION OF THE RELATED ART

Figure 9:
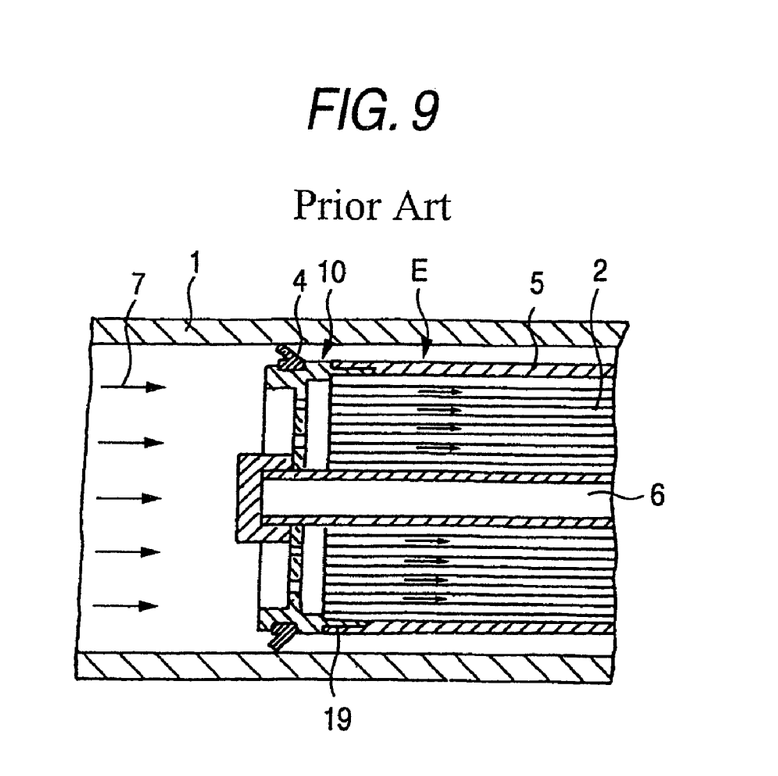
FIG. 9 is a sectional view showing part of a conventional seal ring holder for membrane elements which is in an attached state.

Spiral wound separation membrane modules have hitherto been used in a wide range of applications such as the desalting of brine or seawater, production of ultrapure water, and wastewater treatments. As shown in FIG. 9, spiral wound separation membrane modules have a structure which comprises a pressure vessel 1 and a spiral wound separation membrane element E housed therein and in which the space between the vessel 1 and the element E has been closed with a ring seal ring 4 so that a raw liquid 7 supplied is caused to efficiently flow into the element E. The raw liquid which has flowed into the element E is separated with the separation membrane while flowing downstream along the feed-side passage material of the element E. The permeated liquid which has passed through the separation membrane flows along the permeation-side passage material and collected in a water-collecting tube. The membrane part of the element E is constituted of a wound structure 2 including wound membrane leaves each comprising a feed-side passage material, a separation membrane, and a permeation-side passage material which have been superposed.

FIG. 9 shows the state of an end part of the module in which the element E has been fitted into the vessel 1 and a raw liquid 7 is supplied. The end part has such a constitution that the raw liquid 7 supplied is inhibited by the seal ring 4 from passing outside the element E and is caused to wholly flow into the element. The element E has a seal ring holder 10 so that the seal ring 4 is held on the element E.

The seal ring 4 is held by the seal ring holder 10 attached to an end part of the element E. The seal ring 4 is made of, e.g., a rubber and has a U- or V-shaped section. Upon reception of the pressure of a water flow, the seal ring 4 expands outward and in this state, seals the space between itself and the vessel 1.

The seal ring holder 10 generally has a cylindrical part 19 (skirt) for fitting thereinto an end part of the wound structure 2 constituting the membrane part. Namely, the seal ring holder 10 has such a structure that the sheathing member 5 of the element E can be fitted and bonded to the outer periphery of this cylindrical part 19. However, the structure in which the wound structure 2 is inserted into the cylindrical part 19 has had a drawback that the diameter of the wound structure 2 is limited and, hence, to increase the membrane area is limited. In addition, the axis-direction dimension of the wound structure 2 is limited by the thickness of the seal ring holder 10. Although it is hence desirable that the seal ring holder 10 have a smaller thickness, the seal ring holder 10 needs to have at least a certain thickness because it should have a groove formed therein for holding the seal ring 4 and have the strength required of seal ring holders.

On the other hand, treatments with separation membranes are required to attain reduction in the cost of the treatment system. One of the subjects therefor is to increase the area of membranes packed per element. For attaining this, it is necessary to increase the volume of membrane leaves which can be packed. There is hence a desire for a diminution in limitations by the members used.

SUMMARY OF THE INVENTION

Accordingly, one object of the present invention is to provide a seal ring holder for membrane elements, which is capable of attaining an increase in the area of membranes packed per element.

Another object of the present invention is to provide a membrane element using the seal ring holder.

Those objects can be accomplished with the present invention, which is as follows.

The present invention provides a seal ring holder for membrane elements which is disposed at an end part of a spiral wound membrane element to hold a ring seal ring on the outer periphery thereof while allowing a raw liquid to flow into a membrane end part of the membrane element, the seal ring holder comprising:

a first ring part which has a side wall facing an upstream-side membrane end part of the membrane element and is to be inserted into an end part of a sheathing member of the membrane element;

a projecting ring part which has been formed upstream from the first ring part and has side walls respectively on both sides, an edge face of the sheathing member and the downstream-side edge face of the seal ring being fixable respectively to the side walls;

a second ring part which has been formed upstream from the projecting ring part and to the outer periphery of which the seal ring is to be fitted; and a third ring part which has been formed upstream from the second ring part and to which the upstream-side end face of the seal ring is fixable.

In the seal ring holder of the present invention, the first ring part has a side wall facing an upstream-side membrane end part of the membrane element and does not have a structure in which the membrane end part is inserted into the ring part. Because of this, the membrane part (wound structure) can have a larger diameter. Furthermore, the first ring part can be inserted into and fixed to the sheathing member, and a seal ring can be fitted to and held on the outer periphery of the second ring part. Because of this, the width (thickness) of the remaining parts, i.e., the projecting ring part and the third ring part, can be reduced and the axis-direction length of the membrane part can be increased accordingly. As a result, the area of membranes packed per element can be increased.

In the constitution described above, the outer diameter of the third ring part preferably is smaller than the outer diameter of the projecting ring part. When the seal ring holder has this structure, the space between the third ring part and the vessel is increased. Because of this, when a seal ring having a U- or V-shaped section is used, it is more apt to receive the flow or pressure of a raw liquid and, in an outward spread state, performs its sealing function with higher certainty.

Furthermore, it is preferred that the width of the projecting ring part be smaller than the width of the second ring part and the width of the third ring part be smaller than the width of the second ring part, each width being the width as measured in a direction parallel to the axis of the membrane element. When the seal ring holder has this structure, the parts other than the seal ring-holding groove can have a reduced width while securing the seal ring-holding groove, whereby the axis-direction length of the membrane part can be increased and the area of membranes packed can be increased.

It is preferred that a plurality of peripheral groove parts on which height of a peripheral surface was partially low, or cut parts in which the ring part was partially discontinued are disposed at the third ring part. This constitution enables the space between the third ring part and the vessel to partially spread. As a result, when using a seal ring having U- or V-shaped cross-section, it becomes easy to receive the flow or pressure of a raw liquid, and in an outward spread state, it can exhibit its sealing function further certainly.

Furthermore, it is preferred that a plurality of edge groove parts extending from inner circumference to outer circumference are disposed at the edge of the third ring part. In the case of connecting a plurality of membrane elements, the edges are closely contacted with each other in the conventional constitution. As a result, there is the problem that it is difficult to discharge liquid when discharging the liquid in the membrane element when, for example, washing. However, it is possible to smoothly discharge the inner liquid by disposing a plurality of the edge groove parts (this is the same even when the ring part has the discontinued cut parts). In the case that rapid pressure change is applied, high pressure difference generates between the inside and the outside of the sheathing member of the membrane element, and this may lead to the danger of breakage of the membrane element. However, since the liquid passes through the disposed edge groove parts to smoothly flow to the outside of the element, there is no possibility of danger.

The present invention further provides a membrane element which comprises a spiral wound membrane element and the seal ring holder for membrane elements which is disposed upstream from an upstream-side membrane end part of the element, wherein the first ring part is inserted into an end part of the sheathing member of the element.

Since the membrane element of the present invention uses the seal ring holder of the present invention, it can attain an increase in the area of membranes packed therein, as described above.

BRIEF DESCRIPTION OF THE DRAWINGS

FIG. 2 is views showing an example of the seal ring holder for membrane elements of the present invention: 2A is a left-side view; 2B is a sectional view of the seal ring holder taken in the direction of the arrows I-I; and 2C is a right-side view.

FIG. 6 is views showing other example of the seal ring holder for membrane elements of the present invention: 6A is a left-side view; 6B is a sectional view of the seal ring holder taken in the direction of the arrows I-I; and 6C is a sectional view of the seal ring holder taken in the direction of the arrows II-II.

FIG. 7 is views showing other example of the seal ring holder for membrane elements of the present invention: 7A is a view corresponding to the sectional view of the seal ring holder taken in the direction of the arrows I-I in FIG. 6; and 7B is a view corresponding to the sectional view of the seal ring holder taken in the direction of the arrows II-II 9 in FIG. 6.

In the drawings:
2 membrane part of membrane element (wound structure)
4 seal ring
5 sheathing member
10 seal ring holder
11 first ring part
11a side wall of first ring part
12 projecting ring part
13 second ring part
14 third ring part
14c peripheral groove part on third ring part
14d cut portion on third ring part
14e edge groove part on third ring part
E membrane element

DETAILED DESCRIPTION OF THE INVENTION

Figure 1:
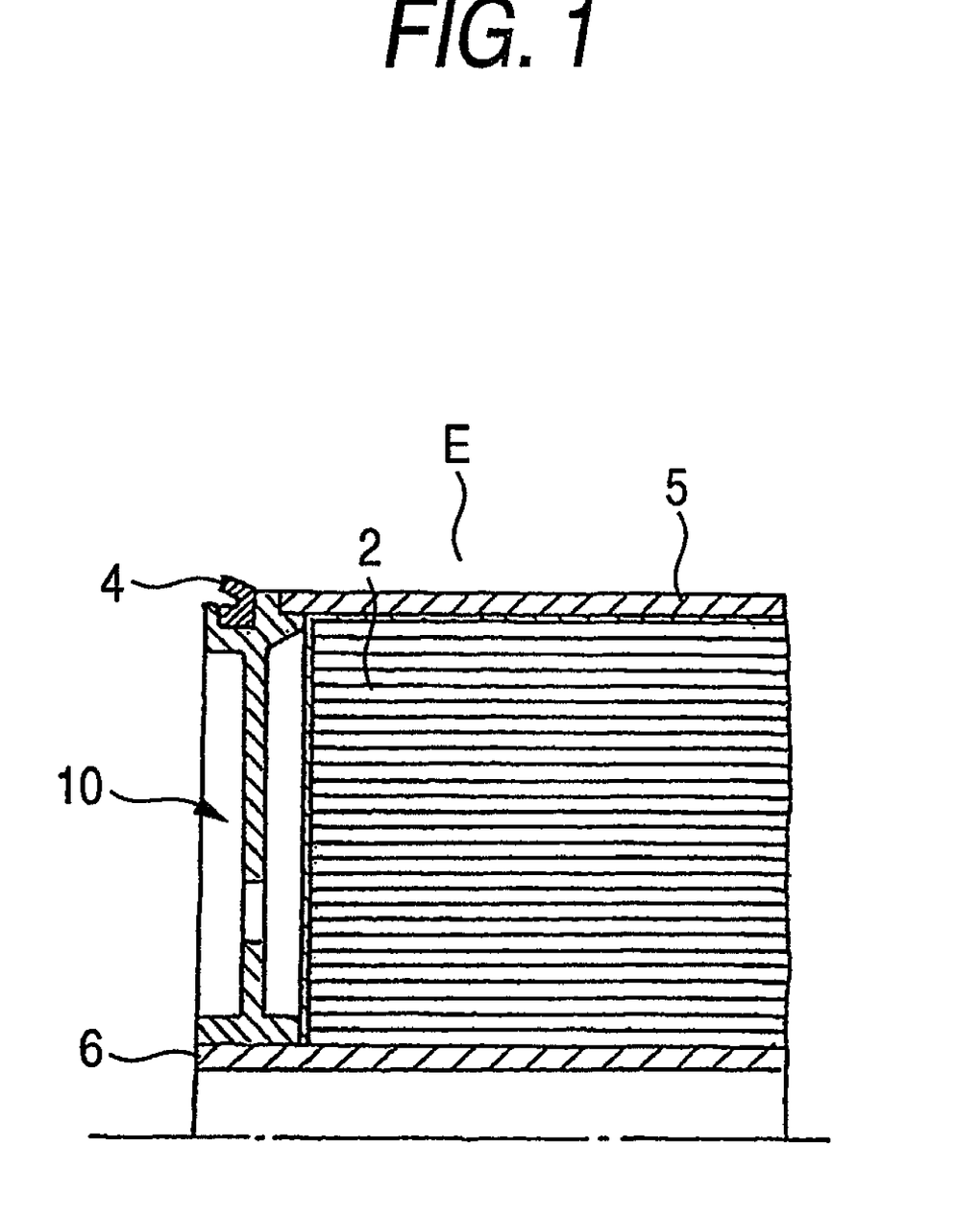
FIG. 1 is a sectional view showing a half of an example of the seal ring holder for membrane elements of the present invention which is in an attached state.
Figure 2A:
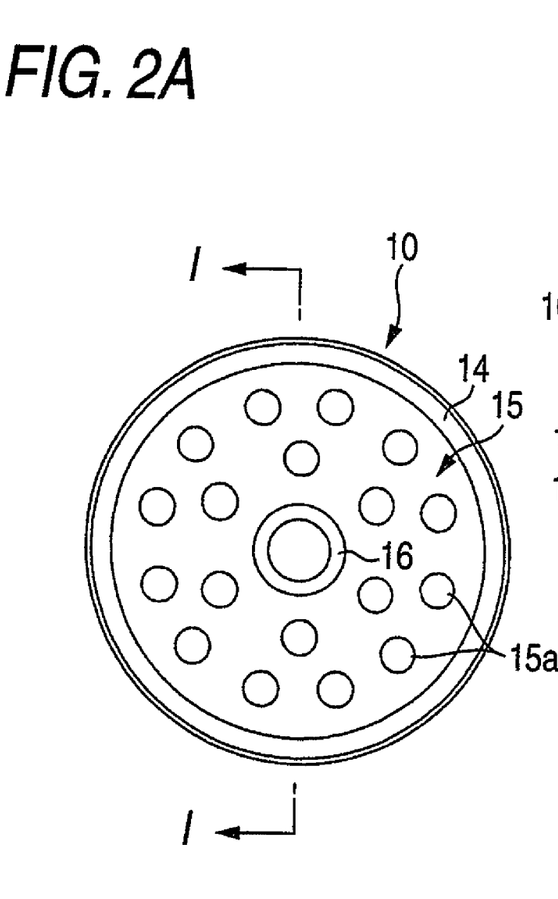
Figure 2B:
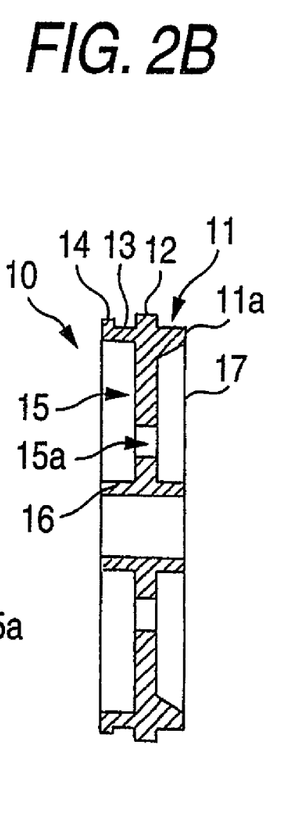
Figure 2C:
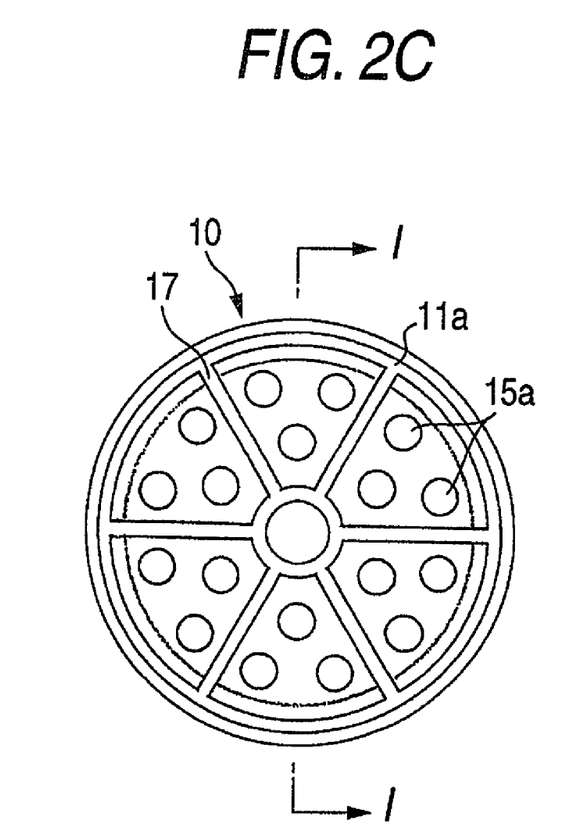

Embodiments of the present invention will be explained below by reference to the accompanying drawings. FIG. 1 is a sectional view showing a half of an example of the seal ring holder for membrane elements of the present invention which is in an attached state. FIG. 2 is views showing an example of the seal ring holder for membrane elements of the present invention: 2A is a left-side view; 2B is a sectional view of the seal ring holder taken in the direction of the arrows I-I; and 2C is a right-side view.

As shown in FIG. 1, the seal ring holder of the present invention is disposed at an end part of a spiral wound membrane element E and serves to hold a ring seal ring on the outer periphery thereof while allowing a raw liquid to flow into a membrane end part of the membrane element E. On the other hand, the membrane element of the present invention comprises a spiral wound membrane element E and the seal ring holder 10 of the present invention disposed upstream from an upstream-side membrane end part of the element E, wherein the first ring part 11 has been inserted into an end part of the sheathing member 5.

The membrane element E may be any element which is a so-called spiral wound membrane element. For example, the membrane part is constituted of a wound structure 2 comprising a central tube (water-collecting tube 6) and, wound therearound, membrane leaves each comprising a feed-side passage material, a separation membrane, and a permeation-side passage material which have been superposed. Each membrane leaf has a sealed structure which prevents a raw liquid from directly flowing from the feed-side passage into the permeation-side passage. Because of this constitution, the raw liquid which has flowed into the membrane element E is separated with the separation membranes while flowing downstream along the feed-side passage materials of the element E. The permeated liquid which has passed through the separation membranes flows along the permeation-side passage materials and collected in the water-collecting tube.

A seal ring 4 is held by the seal ring holder 10 attached to an end part of the membrane element E. The seal ring 4 may have a circular, elliptic, square, or similar section. In the present invention, however, a seal ring 4 having a shape with an open part, such as one having a U- or V-shaped or similar section, is preferred. The seal ring 4 preferably is made of an elastic material such as a rubber, elastomer, or resin. The seal ring 4 having a U- or V-shaped or similar section expands outward upon reception of the pressure of a water flow and can, in this state, seal ring the space between itself and the vessel.

The sheathing member 5 that can be used is, for example, a structure formed by directly winding a tape or sheet of a fiber-reinforced resin on the membrane element E. It is preferred that an end part of the sheathing member 5 be fixed by bonding or the like to the first ring part 11 of the seal ring holder 10.

The water-collecting tube 6 has holes arranged at appropriate intervals, and is made of, e.g., a resin. Before the water-collecting tube 6 is used, the upstream-side end thereof is sealed with, e.g., a plug in order to prevent the raw liquid from flowing thereinto.

As shown in FIG. 2, the seal ring holder of the present invention comprises: a first ring part 11 which has a side wall 11a facing an upstream-side membrane end part of a membrane element E and is inserted into an end part of a sheathing member 5 of the membrane element E; a projecting ring part 12 which is formed upstream from the first ring part 11 and has side walls respectively on both sides, an edge face of the sheathing member 5 and the downstream-side edge face of a seal ring 4 being fixable respectively to the side walls; a second ring part 13 which is formed upstream from the projecting ring part 12 and to the outer periphery of which the seal ring 4 is fitted; and a third ring part 14 which is formed upstream from the second ring part 13 and to which the upstream-side end face of the seal ring is fixable. The seal ring holder of the present invention thus has a structure having no skirt part into which the wound structure 2 including membrane leaves is fitted.

With respect to dimensions (widths as measured in a direction parallel to the axis of the membrane element E) of the parts described above, the width of the projecting ring part 12 is preferably smaller than the width of the second ring part 13. Furthermore, the width of the third ring part 14 is preferably smaller than the width of the second ring part 13.

Specifically, the widths of the first ring part 11, projecting ring part 12, second ring part 13, and third ring part 14 are preferably 5-8 mm, 3-5 mm, 7-8 mm, and 3-5 mm, respectively. When these parts have such dimensions, the seal ring holder as a whole can have a width (thickness) as small as 15-30 mm while securing both the groove into which a seal ring 4 is fitted and a bonding allowance for the sheathing member 5.

It is preferred in the present invention that the outer diameter of the third ring part 14 be smaller than the outer diameter of the projecting ring part 12. In this constitution, the upstream-side wall of the groove for holding a seal ring 4 is lower and, hence, the seal ring 4 is more apt to receive a water flow.

This embodiment has a perforated plate 15 having openings 15a as a structure which allows a raw liquid to flow into a membrane end part of the membrane element E. When the perforated plate 15 is used, the flow rate distribution of the raw liquid flowing into the membrane part of the membrane element E can be easily controlled by changing the size, positions, density, etc., of the openings 15a. It should, however, be noted that the structure for raw-liquid introduction in the present invention should not be construed as being limited to the perforated plate 15, and any appropriate structure such as radially arranged spokes may be used in place of the perforated plate 15.

Preferably, the perforated plate 15 has a cylindrical part 16 at the center thereof and the seal ring holder is disposed, with the water-collecting tube 6 being inserted into this cylindrical part 16. The cylindrical part 16 and the water-collecting tube 6 may be fixed to each other by bonding, etc.

In the embodiment shown in FIG. 1, the water-collecting tube 6 is disposed so that the upstream-side end thereof is flush with the upstream-side end of the side wall of the third ring part 14 of the seal ring holder 10, and the upstream-side end of the cylindrical part 16 is located downstream from these. Similarly, at the downstream-side of the element, the downstream-side end of the water-collecting tube is disposed so as to be flush with the downstream-side end of the side wall of the downstream-side seal carrier. However, by disposing the water-collecting tube 6 so that the upstream-side end thereof is located downstream from the side wall of the third ring part 14 (i.e., located closer to the perforated plate), the length of the wound structure 2 as the membrane part can be made larger for the water-collecting tube 6.

The perforated plate 15 has radially arranged ribs 17 on its membrane element side. These ribs 17 reinforce the perforated plate 15, whereby the total width of the two members can be reduced.

The seal ring holder 10 can be formed from a thermoplastic resin, thermosetting resin, heat-resistant resin, or the like by a conventional technique such as injection molding.

Other embodiments of the present invention will be explained below.

Figure 3:
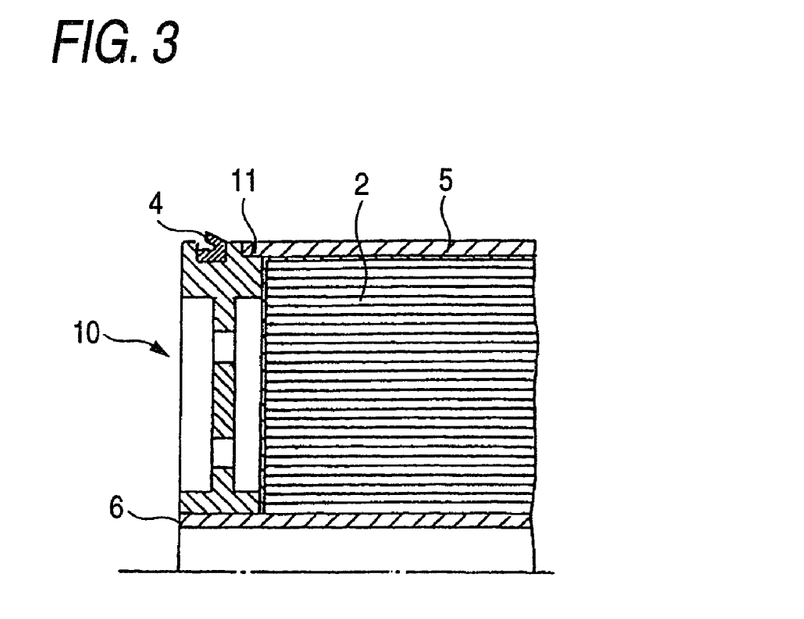
FIG. 3 is a sectional view illustrating a half of another example of the seal ring holder for membrane elements of the present invention.

(1) The embodiment described above is one in which the seal ring holder for membrane elements has the minimum thickness. However, a seal ring holder having the structure shown in FIG. 3, which is formed by modifying the conventional seal ring holder by eliminating the skirt and forming a first ring part 11, may be used. Use of this seal ring holder eliminates the necessity of fitting a wound structure 2 including membrane leaves into the skirt and makes it possible to use a membrane-leaf wound structure 2 having a larger diameter than ones heretofore in use.

Figure 4A:
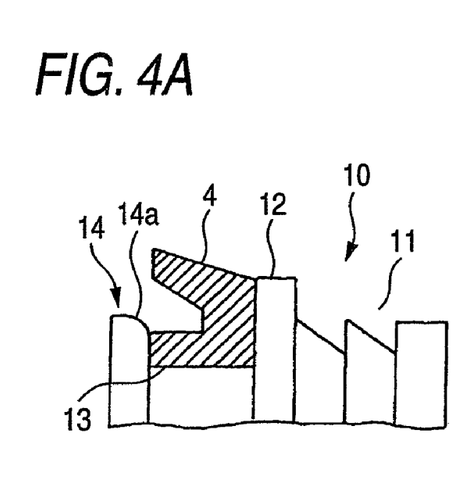
FIGS. 4A and 4B are views showing important parts of other examples of the seal ring holder for membrane elements of the present invention.
Figure 4B:
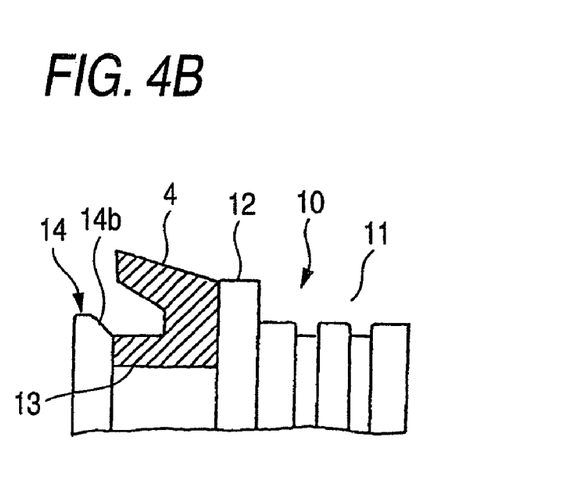
Figure 5A:
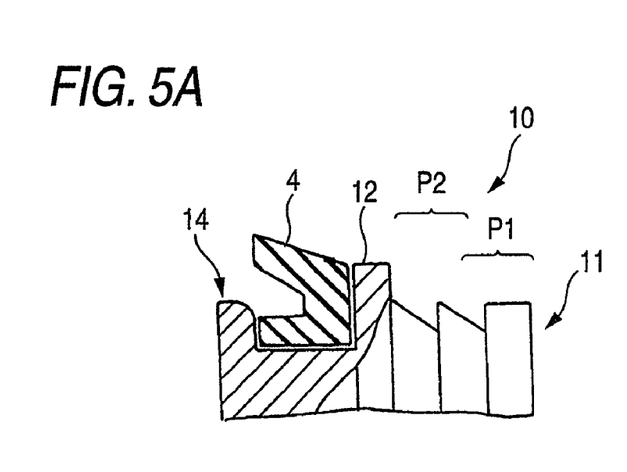
FIGS. 5A, 5B, 5C, 5D and 5E are views important parts of other examples of the seal ring holder for membrane elements of the present invention.
Figure 5B:
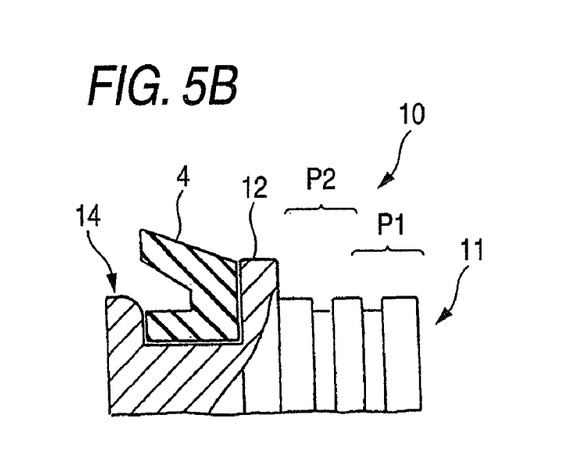
Figure 5C:
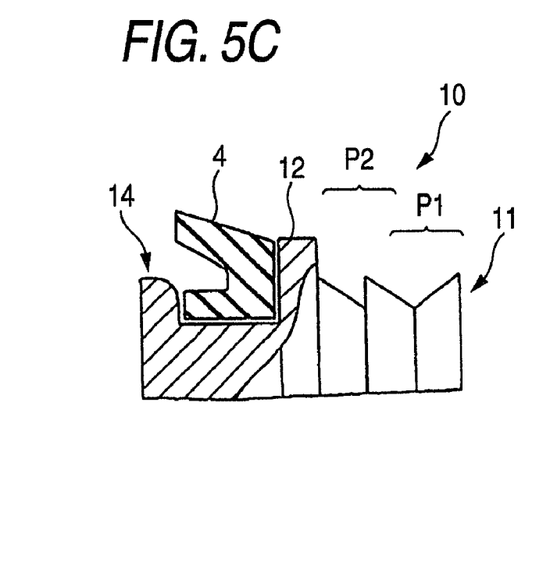
Figure 5D:
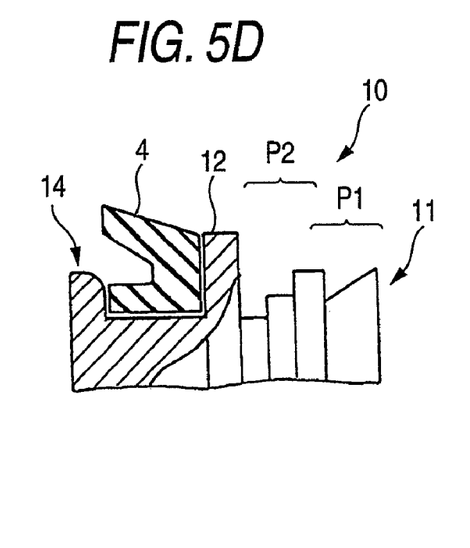
Figure 5E:
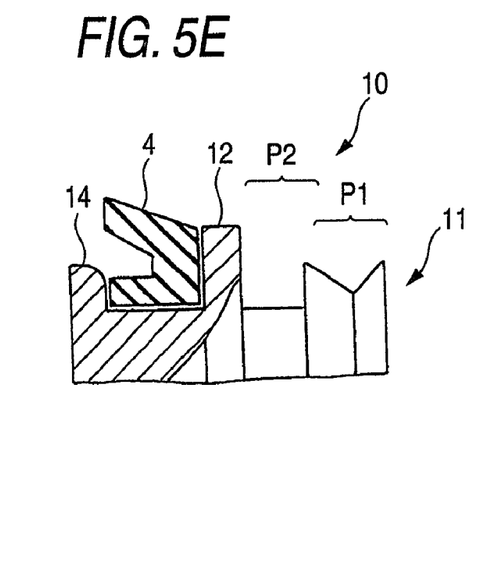

(2) It is preferred in the present invention that the width of the second ring part 13, which corresponds to the width of the groove for holding the seal ring 4, be made close to the thickness of the seal ring 4 as shown in FIGS. 4A and 4B, so as to reduce the overall thickness of the seal ring holder. In this case, it is preferred that the height of the third ring part 14, which is located upstream, be reduced in order to prevent the third ring part 14 from blocking a water flow to the seal ring 14 and that the third ring part 14 be made to have a taper surface in order to enable the seal ring 4 to be more apt to receive a water flow. Examples of the taper surface include a taper surface 14a having a section with a curved contour and a taper surface 14b having a section with a linear contour.

(3) Furthermore, it is preferred that the first ring part 11, which corresponds to a bonding allowance for the sheathing member 5, be subjected to groove formation, notching, surface roughening, or the like for the purpose of enhancing bonding strength, as shown in FIGS. 4A and 4B.

As shown in FIGS. 5A-5E, it is preferred that a portion P1 which fixes the seal ring holder 10 and the wound structure 2 and a portion P2 which fixes the seal ring holder 10 and the sheathing member 5 are disposed on the first ring part 11. The bonding allowance between the seal ring holder 10 and the sheathing member 5 of the first ring part 11 has a role to strongly adhere the seal ring holder 10 and the sheathing member 5 and maintain its adhered state. In coating the sheathing member 5, a pressure-sensitive adhesive tape, a glass cloth or the like is wound at the faced portion of the sheathing member 5 and the wound structure 2 to fix those. This fixing is also necessary to prevent influx of the resin from the faced portion to the edge of the wound structure.

Further, as shown in FIGS. 5A-5E, it is preferred that the portion fixing the seal ring holder 10 has a step mark such that a pressure-sensitive adhesive tape or the like does not drop off, or has a taper becoming deeply toward the direction of the projecting ring part. In addition, it is preferred that the part adhering the sheathing member and maintaining the same has a structure such that a step mark is provided on the adhered portion so as not to cause deviation in a shearing direction, thereby maintaining the same against a parting force.

Figure 6A:
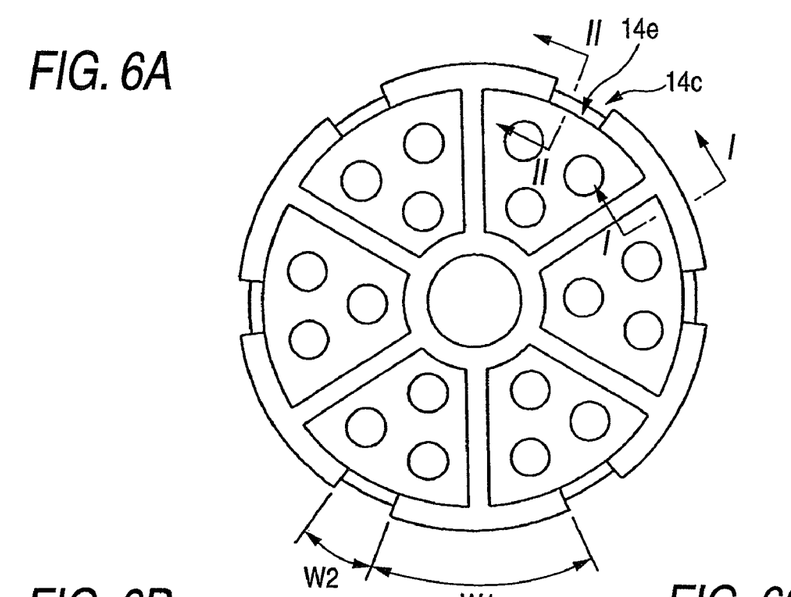
Figure 6B:
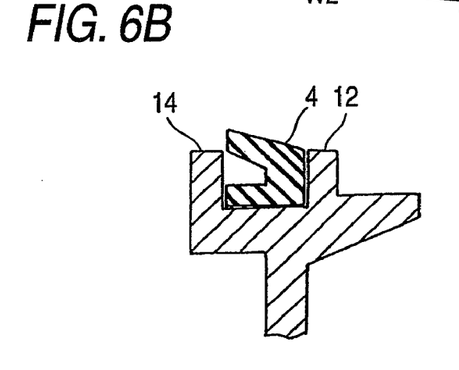
Figure 6C:
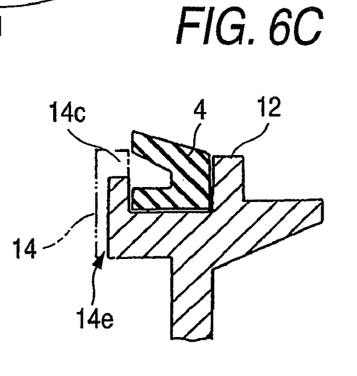
Figure 7A:
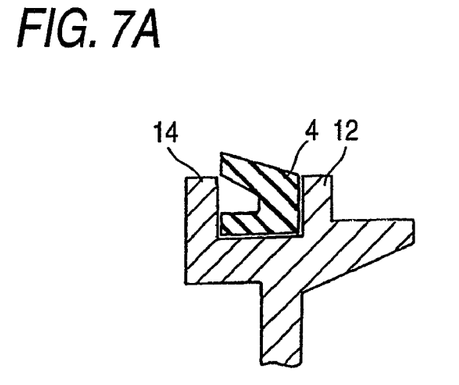
Figure 7B:
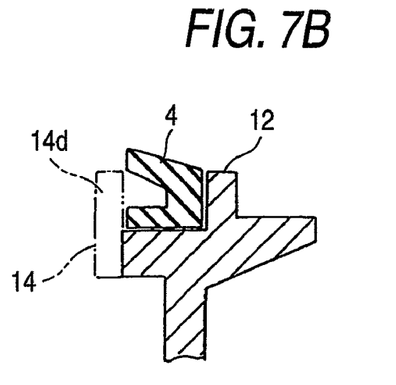

(4) As shown in FIGS. 6A-6C, a plurality of peripheral groove parts 14c on which height of a peripheral surface was partially low may be disposed on the third ring part 14. Further, as shown in FIGS. 7A-7C, cut parts 14d in which the ring part was partially discontinued may be disposed on the third ring part 14. The depth of the peripheral groove part 14c is preferably 0.5-3 mm. The number of the peripheral groove parts 14c disposed is preferably 4 or more, and more preferably 6-16.

(5) On the other hand, as shown in FIGS. 6A-6C, a plurality of edge groove parts 14e extending from inner circumference to outer circumference may be disposed at the edge of the third ring part 14. The cut parts 14d in the third ring part 14 shown in FIG. 7B also have the function as the edge groove part extending from inner circumference to outer circumference. To facilitate inflow and outflow of water inside and outside the membrane element, the edge groove parts 14e are arranged in the circumferential direction with a uniform distance in the number of preferably 4 or more, and more preferably 6-16.

In the connecting portion of the membrane element, where width W1 on an edge between a groove and the adjacent groove is 1, the width W of the edge groove part 14e is preferably 0.9 or less to the width W1 such that recesses and projections of the edge groove parts 14e do not overlap.

The present invention is described in more detail by reference to the following Examples, but it should be understood that the invention is not construed as being limited thereto.

Example 1

A seal ring holder having the structure shown in FIG. 2 was produced. This seal ring holder had no skirt and had the following dimensions. Overall thickness (same as the thickness from the surface for butt joint with wound-structure end face): 20 mm, bonding allowance for sheathing member: 6 mm, width of seal ring groove: 8 mm, depth of seal ring groove: 6.5 mm, upstream-side wall height of seal ring groove: 3.5 mm.

Comparative Example 1

Figure 8:
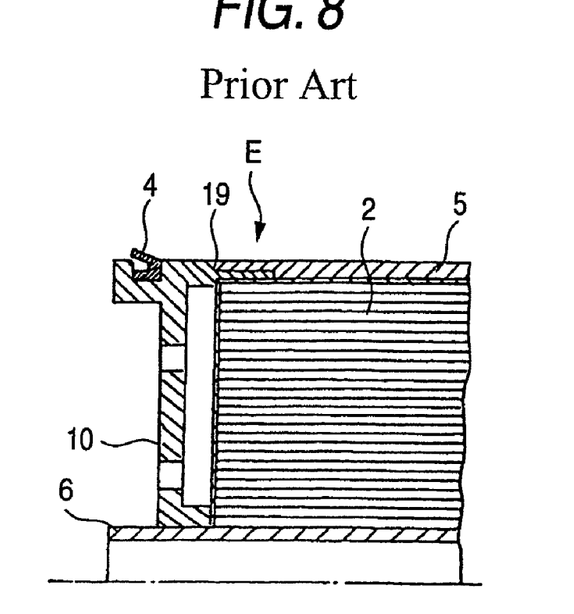
FIG. 8 is a sectional view illustrating a half of an example of conventional seal ring holders for membrane elements.

A conventional seal ring holder having the structure shown in FIG. 8 was produced. This seal ring holder had a skirt having an inner diameter of 194 mm, and had the following dimensions. Overall thickness: 48 mm, thickness from the surface for butt joint with wound-structure end face: 37 mm, bonding allowance for sheathing member (including the skirt part): 27 mm, width of seal ring groove: 9 mm, depth of seal ring groove: 6.5 mm. The upstream-side wall was equal in height to the downstream-side wall.

Element Production Example

The seal ring holders obtained in Example 1 and Comparative Example 1 were used to produce spiral wound membrane elements. Membrane leaf-constituting members having the same thickness were used in producing each spiral wound membrane element. A membrane having a length of 1,480 mm was folded double, with a raw-water passage material being sandwiched therebetween, to produce a unit leaf. Such unit leaves were wound around a water-collecting tube together with a permeated water-passage material. Results of a comparison between the two systems are shown in the Table below.

The wound structure including 33 leaves had a diameter of 197 mm. Although this wound structure could not be fitted with the conventional seal ring holder of Comparative Example 1, the seal ring holder of Example 1 according to the present invention could be attached thereto. The element produced with the conventional seal ring holder contained 31 leaves. Namely, the number of membrane leaves could be increased by 2. The membrane leaf width heretofore in use could be increased by 37 mm, resulting in an increase in total membrane area of 4.6 m$^2$. Furthermore, the area of the membranes effective in actual treatment, i.e., the area obtained by subtracting the loss due to the membrane leaf bonding parts, increased by 4.2 m$^2$.

TABLE

|  | Example 1 | Comparative Example 1 |
| --- | --- | --- |
| Number of membrane leaves | 33 | 31 |
| Diameter of wound structure (mm) | 197 | 189 |
| Width of membrane leaf (mm) | 975 | 938 |
| Area of membranes used (m$^2$) | 47.6 | 43.0 |
| Effective area of membranes (m$^2$) | 41.7 | 37.5 |

It should further be apparent to those skilled in the art that various changes in form and detail of the invention as shown and described above may be made. It is intended that such changes be included within the spirit and scope of the claims appended hereto.

What is claimed is:

1. A cap which is attachable to one end of a spiral wound membrane element, the cap comprising:
    a disk-shaped main body having a first face disposed at a side of the spiral wound membrane element when the cap is attached to the spiral wound membrane element and a second face opposite to the first face; and
    a circumferential wall circularly formed on the second face of the main body and having an inner circumferential face and an outer circumferential face,
    wherein a plurality of grooves are formed on the circumferential wall and the grooves extend from the inner circumferential face to the outer circumferential face.

2. The cap according to claim 1, wherein the grooves extend in the radial direction of the disk-shaped main body.

3. The cap according to claim 1, wherein the grooves are arranged in the circumferential direction of the disk-shaped main body with a uniform distance.

4. The cap according to claim 1, wherein the number of the grooves formed on the circumferential wall is four or more.

5. The cap according to claim 1, wherein a width of one of the grooves is smaller than a width of a part of the circumferential wall between the adjacent grooves.

6. The cap according to claim 1, wherein an outer peripheral face of the disk-shaped main body, which connects the first face and the second face is configured to hold the seal ring thereon.

7. A membrane element comprising:
a spiral wound membrane element;
the cap according to claim 1, attached to the spiral wound membrane element.

* * * * *